(12) United States Patent
Li et al.

(10) Patent No.: US 9,362,016 B2
(45) Date of Patent: Jun. 7, 2016

(54) CATHODE ACTIVE MATERIAL, METHOD FOR MAKING THE SAME AND LITHIUM ION BATTERY USING THE SAME

(75) Inventors: Jian-Gang Li, Beijing (CN); Xiang-Ming He, Beijing (CN); Jian-Jun Li, Beijing (CN); Jian Gao, Beijing (CN); Li Wang, Beijing (CN)

(73) Assignees: Tsinghua University, Beijing (CN); HON HAI PRECISION INDUSTRY CO., LTD., New Taipei (TW)

( * ) Notice: Subject to any disclaimer, the term of this patent is extended or adjusted under 35 U.S.C. 154(b) by 838 days.

(21) Appl. No.: 13/553,931

(22) Filed: Jul. 20, 2012

(65) Prior Publication Data
US 2013/0136990 A1 May 30, 2013

(30) Foreign Application Priority Data

Nov. 25, 2011 (CN) .......................... 2011 1 0380626

(51) Int. Cl.
*H01B 1/08* (2006.01)
*H01M 4/00* (2006.01)
(Continued)

(52) U.S. Cl.
CPC ...... *H01B 1/08* (2013.01); *C01G 53/54* (2013.01); *H01M 4/0471* (2013.01); *H01M 4/1391* (2013.01); *H01M 4/366* (2013.01);
(Continued)

(58) Field of Classification Search
CPC ...... H01B 1/08; H01M 4/0402; H01M 4/131; H01M 4/505; H01M 4/525; C01G 53/44; C01G 53/54
See application file for complete search history.

(56) References Cited

U.S. PATENT DOCUMENTS

2010/0086853 A1* 4/2010 Venkatachalam ... H01M 4/1391
429/223
2012/0263998 A1* 10/2012 Thackeray et al. ........... 429/156
2013/0078518 A1* 3/2013 Thackeray et al. ........... 429/221

FOREIGN PATENT DOCUMENTS

| CN | 1416189 | 5/2003 |
|----|---------|--------|
| CN | 101335348 | 12/2008 |

OTHER PUBLICATIONS

Myung et al "Surface modification of cathode materials . . . ", Journal of Mat Chem 2010, 20, 7074-7095 (May 28, 2010).*
(Continued)

*Primary Examiner* — Mark Kopec
(74) *Attorney, Agent, or Firm* — Novak Druce Connolly Bove + Quigg LLP

(57) ABSTRACT

A cathode active material of a lithium ion battery includes a number of $LiNi_{0.5}Mn_{1.5}O_4$ particles and an $AlF_3$ layer coated on a surface of the $LiNi_{0.5}Mn_{1.5}O_4$ particles. A method for making the cathode active material is provided. In the method, a number of $LiNi_{0.5}Mn_{1.5}O_4$ particles are provided. The $LiNi_{0.5}Mn_{1.5}O_4$ particles are added to a trivalent aluminum source solution to form a solid-liquid mixture. A fluorine source solution is put into the solid-liquid mixture to react and form an $AlF_3$ layer coated on the surface of the $LiNi_{0.5}Mn_{1.5}O_4$ particles. The coated $LiNi_{0.5}Mn_{1.5}O_4$ particles are heat treated to form the cathode active material. A lithium ion battery including the cathode active material is also provided.

5 Claims, 8 Drawing Sheets

(51) Int. Cl.
*C01G 53/00* (2006.01)
*H01M 4/04* (2006.01)
*H01M 4/1391* (2010.01)
*H01M 4/36* (2006.01)
*H01M 4/505* (2010.01)
*H01M 4/62* (2006.01)

(52) U.S. Cl.
CPC ............... *H01M 4/505* (2013.01); *H01M 4/62* (2013.01); *C01P 2002/72* (2013.01); *C01P 2004/03* (2013.01); *C01P 2004/80* (2013.01); *C01P 2006/40* (2013.01); *Y02E 60/122* (2013.01); *Y02P 70/54* (2015.11)

(56) References Cited

OTHER PUBLICATIONS

Park et al "Improvement of structural and electrochemical properties of Alf#-coated Li(Ni1/3Co1/3Mn1/3)O2 cathode materials on high voltage region", Journal of Power Sources 178 (2008) 826-831.*

Lin et al "The effects of quenching treatment and AlF3 coating on LiNi0.5Mn0.5O2 cathode materials for lithium-ion battery", Mat. Chem. and Physics 119 (2010) 519-523.*

"AlF3 coating of LiNi0.5 Mn1.5O4 for high-performance Li-ion batteries", Jiangang Li et al., Ionics, vol. 17, No. 8, pp. 671-675, Sep. 2011.

* cited by examiner

CATHODE ACTIVE MATERIAL, METHOD FOR MAKING THE SAME AND LITHIUM ION BATTERY USING THE SAME

CROSS-REFERENCE TO RELATED APPLICATIONS

This application claims all benefits accruing under 35 U.S.C. §119 from China Patent Application No. 201110380626.6, filed on Nov. 25, 2011 in the China Intellectual Property Office, the contents of which are hereby incorporated by reference.

BACKGROUND

1. Technical Field

The present disclosure relates to cathode active materials of lithium ion batteries, methods for making the same and lithium ion batteries using the same.

2. Description of Related Art $LiNi_{0.5}Mn_{0.5}O_4$ is an attractive cathode active material for lithium ion batteries with a high specific capacity, good cycling performance, low cost, and low toxicity. The $LiNi_{0.5}Mn_{0.5}O_4$ can be charged to a high voltage. However, electrolytes of the lithium ion batteries can be easily decomposed at the cathodes of the lithium ion batteries under a high charge voltage. The decomposition of the electrolytes results in a decrease of cycle performances of the lithium ion batteries.

What is needed, therefore, is to provide a cathode active material of lithium ion batteries and a method for making the same which can improve the cycle performances of the lithium ion batteries.

BRIEF DESCRIPTION OF THE DRAWING

Many aspects of the present disclosure can be better understood with reference to the following drawings. The components in the drawings are not necessarily to scale, the emphasis instead being placed upon clearly illustrating the principles of the present embodiments.

DETAILED DESCRIPTION

The disclosure is illustrated by way of example and not by way of limitation in the figures of the accompanying drawings in which like references indicate similar elements. It should be noted that references to "another," "an," or "one" embodiment in this disclosure are not necessarily to the same embodiment, and such references mean at least one.

Figure 1:
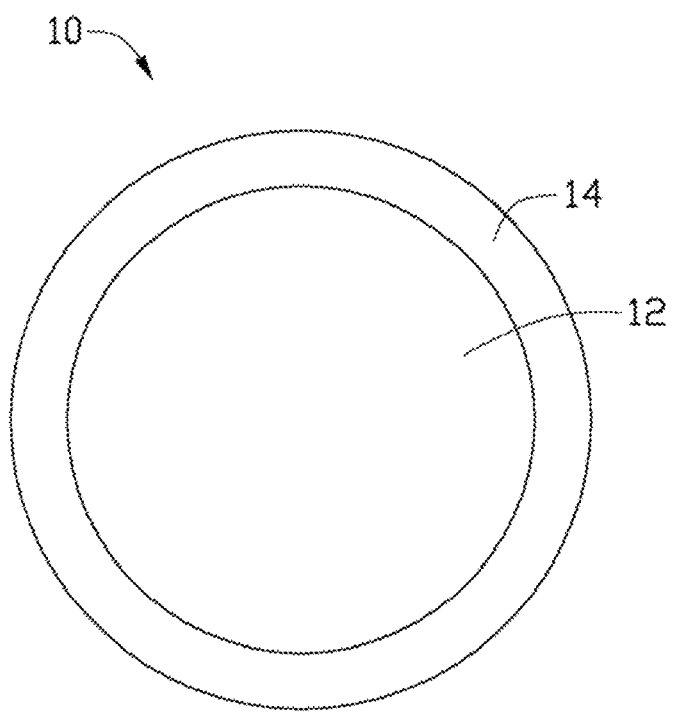
FIG. 1 is a structural view of a cathode active material of a lithium ion battery.

Referring to FIG. 1, one embodiment of a cathode active material 10 of a lithium ion battery includes a plurality of $LiNi_{0.5}Mn_{1.5}O_4$ particles 12 and an aluminum fluoride ($AlF_3$) layer 14 coated on a surface of the plurality of $LiNi_{0.5}Mn_{1.5}O_4$ particles 12.

The $AlF_3$ layer 14 can have a substantially uniform thickness, and appears as a continuous material layer. The $AlF_3$ layer 14 may be entirely coated on the surface of a single particle of the plurality of $LiNi_{0.5}Mn_{1.5}O_4$ particles 12. A thickness of the $AlF_3$ layer 14 can be in a range from about 8 nanometers to about 20 nanometers. In one embodiment, the thickness of the $AlF_3$ layer 14 is about 12 nanometers. A molar percentage (mol %) of the $AlF_3$ layer 14 to the cathode active material 10 can be in a range from about 0.3 mol % to about 8 mol %. In one embodiment, the molar ratio is in a range from about 1 mol % to about 4 mol %. In another embodiment, the molar ratio is about 4 mol %.

The plurality of $LiNi_{0.5}Mn_{1.5}O_4$ particles 12 can be spherical particles. A diameter of the plurality of $LiNi_{0.5}Mn_{1.5}O_4$ particles 12 can be in a range from about 50 nanometers to about 60 micrometers. In one embodiment, the diameter can be in a range from about 60 nanometers to about 20 micrometers.

Figure 2:
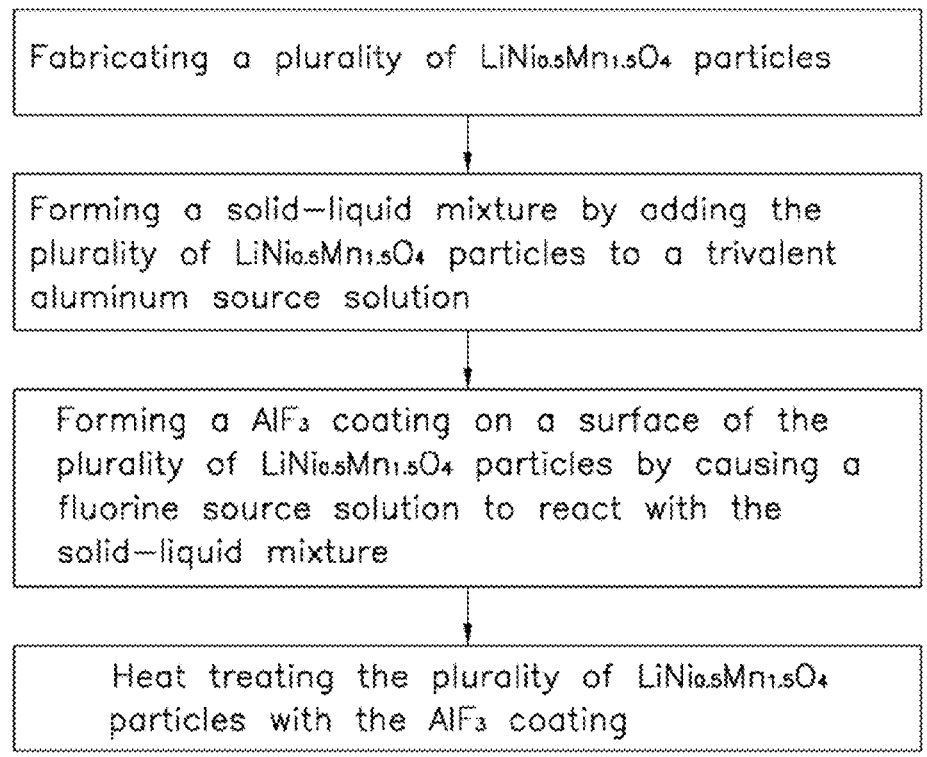
FIG. 2 is a flowchart of a method for making the cathode active material.

Referring to FIG. 2, one embodiment of a method for making the cathode active material 10 includes the following steps:

S1, providing the plurality of $LiNi_{0.5}Mn_{1.5}O_4$ particles 12;

S2, adding the plurality of $LiNi_{0.5}Mn_{1.5}O_4$ particles 12 to a trivalent aluminum source solution to form a solid-liquid mixture;

S3, putting a fluorine source solution into the solid-liquid mixture to form the $AlF_3$ layer 14 coated on the surface of the plurality of $LiNi_{0.5}Mn_{1.5}O_4$ particles 12; and S4, heat treating the plurality of coated $LiNi_{0.5}Mn_{1.5}O_4$ particles 12.

In step S1, the plurality of $LiNi_{0.5}Mn_{1.5}O_4$ particles 12 can be fabricated by the following substeps:

S11, providing a nickel (Ni) source and manganese (Mn) source, wherein the Ni and Mn sources are all soluble to a liquid solvent;

S12, dissolving the Ni source and Mn source to the liquid solvent at a molar ratio of Ni:Mn=0.5:1.5 to achieve a liquid solution containing nickel ions ($Ni^+$) and manganese ions ($Mn^{2+}$);

S13, adding a precipitant into the liquid solution to co-precipitate the $Ni^+$ and $Mn^{2+}$, thereby achieving a coprecipitation;

S14, separating the coprecipitation from the liquid solution;

S15, annealing the coprecipitation to obtain a Ni—Mn oxide; and

S16, heating the coprecipitation mixed with a lithium (Li) source at a temperature of about 600° C. to about 950° C.

In step S11, the Ni source can be at least one of nitrate, sulfate, formate, acetate, chloride, and citrate of Ni. The Mn source can be at least one of nitrate, sulfate, formate, acetate, chloride, and citrate of Mn. In one embodiment, the Ni source is the nitrate of Ni, and the Mn source is the nitrate of Mn. The liquid solvent is a medium that can ionize the Ni source and Mn source and is easy to evaporate. The liquid solvent has no chemical reaction with the Ni and Mn sources. The liquid solvent can be at least one of water, ethanol, acetone, and propanol. In one embodiment, the liquid solvent is water.

In step S12, by dissolving the Ni source and Mn source to the liquid solvent, the Ni and Mn elements can be uniformly mixed at an atomic level, and can avoid segregation, aggregation, and differentiation caused by a solid phase mixing process of the Ni source and Mn source.

In step S13, the precipitant can be ionized in the liquid solution to form anions, and the anions can precipitate the $Ni^+$ and $Mn^{2+}$ from the liquid solvent simultaneously. The precipitant can be a water soluble substance that generates at least on of $CO_3^{2-}$, $C_2O_4^{2-}$, and $OH^-$ in water solvent, such as NaOH, KOH, $Na_2CO_3$, $K_2CO_3$, $Na_2C_2O_4$, $K_2C_2O_4$, $H_2C_2O_4$, or $(NH_4)_2C_2O_4$. In one embodiment, the precipitant is $Na_2CO_3$.

The precipitant can be slowly dropped into the liquid solution and while the liquid solution is continuously stirred. The liquid solution can be further stirred for about 4 hours to about 6 hours after the precipitant is completely added into the liquid solution, to completely precipitate the $Ni^+$ and $Mn^{2+}$. In one embodiment, the coprecipitation is a carbonate of Ni—Mn.

In step S14, the coprecipitation can be separated from the liquid solution by a filtering step. The filtered coprecipitation can be washed by deionized water several times, and can be dried for about 12 hours to about 15 hours in a vacuum atmosphere. The obtained coprecipitation has a loose structure and a large specific surface area, which makes it easy for Li to adequately diffusedly enter spaces in the structure during the heating step of S16, to uniformly distribute the Li element.

In step S15, the coprecipitation can be annealed at a temperature of about 500° C. to about 700° C. for about 4 hours to about 8 hours, under a standard atmosphere pressure. In one embodiment, the temperature of annealing is about 600° C.

In step S16, the Li source can be, but not limited to LiOH, $LiNO_3$, or $Li_2CO_3$. A molar ratio of the Li element in the Li source to a total amount of the Ni and Mn elements in the coprecipitation can be larger than 0.50:1, and smaller or equal to 0.55:1. In one embodiment, the molar ratio is about 0.52:1. In one embodiment, the Li source is $Li_2CO_3$.

The step S16 can further include the steps of: uniformly mixing the coprecipitation with the Li source such as grinding to achieve a solid mixture; and calcining the solid mixture at a high temperature. The solid mixture can be calcined in a muffle furnace in air to form the $LiNi_{0.5}M_{1.5}O_4$ particles 12. A calcining temperature can be in a range from about 750° C. to about 900° C. In one embodiment, the calcining temperature is about 850° C. A time period of the calcining temperature can be in a range from about 10 hours to about 20 hours. In one embodiment, the time period of the calcining temperature is about 12 hours. The plurality of $LiNi_{0.5}Mn_{1.5}O_4$ particles 12 can be spherized for easily coating.

The trivalent aluminum source and the fluorine source should meet the following conditions: (a) both the trivalent aluminum source and the fluorine are soluble in a liquid solvent; (b) the trivalent aluminum source can react with the fluorine source to form $AlF_3$; and (c) other products except the $AlF_3$ of the reaction between the trivalent aluminum source and the fluorine source can be removed by a heating step.

In step S2, the trivalent aluminum source solution cannot react with the plurality of $LiNi_{0.5}Mn_{1.5}O_4$ particles 12. The trivalent aluminum source solution includes a first amount of solvent and the trivalent aluminum source dissolved in the first amount of solvent. The trivalent aluminum source and the first amount of solvent can be mutually soluble. Aluminum ions ($Al^{3+}$) can be dissociated from the trivalent aluminum source in the first amount of solvent. The first amount of solvent can be at least one of water, absolute ethanol, acetone, chloroform, diethyl ether, and dichloromethane. The trivalent aluminum source can be aluminum nitrate ($Al(NO_3)_3$) or aluminum isopropoxide ($C_9H_{21}AlO_3$). In one embodiment, the trivalent aluminum source solution is a solution of $Al(NO_3)_3$ dissolved in water.

In step S2, the $Al^{3+}$ ions are uniformly adhered to the surface of the plurality of $LiNi_{0.5}Mn_{1.5}O_4$ particles 12. In one embodiment, the solid-liquid mixture can be a suspension. The suspension can be stirred during the process of adding the plurality of $LiNi_{0.5}Mn_{1.5}O_4$ particles 12 to make the plurality of $LiNi_{0.5}Mn_{1.5}O_4$ particles 12 uniformly distributed therein. In another embodiment, the solid-liquid mixture can be a pasty mixture. An amount of the trivalent aluminum source solution is only enough to cover the entire surface of each of the plurality of $LiNi_{0.5}Mn_{1.5}O_4$ particles 12. A relationship between the amount of the trivalent aluminum source solution and the plurality of $LiNi_{0.5}Mn_{1.5}O_4$ particles 12 can be represented by an equation of $1:40 \leq V_{Al\text{-}source}:V_{LiNi0.5Mn1.5O4} \leq 1:10$, wherein $V_{Al\text{-}source}$ represents a volume of the trivalent aluminum source solution, and $V_{LiNi0.5Mn1.5O4}$ represents a volume of the plurality of $LiNi_{0.5}Mn_{1.5}O_4$ particles 12. The amount of the trivalent aluminum source can be determined by the amount of $AlF_3$ required in the cathode active material 10. The molar percentage of the $AlF_3$ in the cathode active material 10 can be in a range from about 1 mol % to about 4 mol %. The pasty mixture not only insures a thin covering layer of the trivalent aluminum source solution on the surface of the plurality of $LiNi_{0.5}Mn_{1.5}O_4$ particles 12, but also can tightly combine the formed $AlF_3$ layer 14 with the surface of the plurality of $LiNi_{0.5}Mn_{1.5}O_4$ particles 12. A diameter of the plurality of $LiNi_{0.5}Mn_{1.5}O_4$ particles 12 can be smaller than 20 micrometers.

In step S3, the fluorine source solution includes a second amount of solvent and a fluorine source dissolved in the second amount of solvent. The second amount of solvent can be water. $F^-$ can be dissociated from the fluorine source in the second amount of solvent. $F^-$ can react with the $Al^{3+}$ adhered on the surface of the plurality of $LiNi_{0.5}Mn_{1.5}O_4$ particles 12, and in-situ form the $AlF_3$ layer 14. In one embodiment, the fluorine source solution can be ammonium fluoride ($NH_4F$) dissolved in water. A molar ratio of the $F^-$ and $Al^{3+}$ can be about 3:1 to make the $Al^{3+}$ react thoroughly.

In step S3, the fluorine source solution can be slowly added to and stirred with the solid-liquid mixture at the same time to make the fluorine source and the trivalent aluminum source be uniformly reacted with each other. Therefore, a uniform $AlF_3$ layer 14 can be coated on the surface of each of the plurality of $LiNi_{0.5}Mn_{1.5}O_4$ particles 12. In addition, a mixture of the fluorine source solution and the solid-liquid mixture can be heated during the reacting process.

The plurality of $LiNi_{0.5}Mn_{1.5}O_4$ particles 12 with coatings can be separated from the liquid solvent after the step S3. The plurality of $LiNi_{0.5}Mn_{1.5}O_4$ particles 12 with coatings can be filtered and dried to remove the liquid solvent.

There are several purposes of heat treating in step S4. First, the liquid phase solvent and the reaction products except $AlF_3$ (e.g., $NH_4NO_3$) after the step S3 can be removed. Second, the $AlF_3$ layer 14 can be tightly combined and wholly coated on the surface of the plurality of $LiNi_{0.5}Mn_{1.5}O_4$ particles 12. A heat treating temperature can be in a range from about 300° C. to about 500° C., and a time period for the heat treating can be in a range from about 2 hours to about 10 hours. In one embodiment, the heat treating temperature is about 400° C., and a time period for the heat treating is about 5 hours. In addition, the heat treating step can be conducted in an inert atmosphere, such as a $N_2$ atmosphere.

One embodiment of a lithium ion battery includes a cathode, an anode, and a non-aqueous electrolyte disposed between the cathode and the anode. The cathode includes a cathode current collector and a cathode material layer disposed on a surface of the cathode current collector. The cathode material layer includes a cathode active material. The anode includes an anode current collector and an anode material layer disposed on a surface of the anode. The anode material layer includes an anode active material, wherein the cathode active material includes the cathode active material 10.

The cathode material layer further includes a conductive agent and a binder. The conductive agent and the binder are evenly mixed with the cathode active material 10. The $AlF_3$ layer 14 may be entirely coated on the surface of an individual one of the plurality of $LiNi_{0.5}Mn_{1.5}O_4$ particles 12 in the cathode active material 10.

The anode material layer further includes the conductive agent and the binder. The conductive agent and the binder are evenly mixed with the anode active material. The anode active material can at least one of metal lithium, lithium titanate, graphite, acetylene black, organic cracking carbon, and mesocarbon microbeads (MCMB). More specifically, the formula of the lithium titanate can be $Li_{(4-g)}A_gTi_5O_{12}$ or $Li_4A_hTi_{(5-h)}O_{12}$, wherein $0<g\leq0.33$ and $0<h\leq0.5$. In the formula, 'A' represents at least one of the chemical elements of alkali metal elements, alkaline-earth metal elements, Group-13 elements, Group-14 elements, transition metal elements, and rare-earth elements. In one embodiment, 'A' represents at least one of the chemical elements of Mn, Ni, Cr, Co, V, Ti, Al, Fe, Ga, Nd, and Mg. The conductive agent can be at least one of graphite, Polyvinylidene Fluoride (PVDF), Polytetrafluoroethylene (PTFE), and Styrene-Butadiene Rubber (SBR).

The non-aqueous electrolyte can be a non-aqueous electrolyte solution or a solid electrolyte film. The solid electrolyte film is disposed between the cathode material layer and the anode material layer when applied in the lithium ion battery. Lithium ion battery using the non-aqueous electrolyte solution can further include a separator disposed between the cathode material layer and the anode material layer. The non-aqueous electrolyte solution includes a solvent and an electrolyte salt dissolved in the solvent. The solvent of the non-aqueous electrolyte solution can be at least one of ethylene carbonate (EC), propylene carbonate (PC), ethylmethyl carbonate (EMC), diethyl carbonate (DEC), dimethyl carbonate (DMC), methyl acetate, ethyl acetate, propyl acetate, methyl propionate, ethyl propionate, γ-butyrolactone, tetrahydrofuran, 1,2-Dimethoxyethane, acetonitrile, and Dimethylformamide. The electrolyte salt can be at least one of lithium hexafluorophosphate ($LiPF_6$), lithium tetrafluoroborate ($LiBF_4$), and lithium bis (oxalato) borate (LiBOB). A material of the solid electrolyte film can be lithium iodide (LiI), lithium nitride ($LiN_3$), or a mixture of a polymer matrix and the electrolyte salt. The polymer matrix can be polyoxyethylene (PEO) or Polyacrylonitrile (PAN).

Example 1

In this example, the plurality of $LiNi_{0.5}Mn_{1.5}O_4$ particles 12 are prepared and labeled sample 1. The Ni source and Mn source are the nitrate. To prepare $LiNi_{0.5}Mn_{1.5}O_4$, $Ni(NO_3)_2$ and $Mn(NO_3)_2$ are provided at a molar ratio of about 0.5:1.5, and dissolved in water. $Na_2CO_3$ used as the precipitant is firstly dissolved in water to form a $Na_2CO_3$ water solution. The $Na_2CO_3$ water solution is then mixed with the water solution of the $Ni(NO_3)_2$ and $Mn(NO_3)_2$ to form the coprecipitation. $Li_2CO_3$ used as Li source is mixed with the dried coprecipitation. The molar ratio between $Li_2CO_3$ and the total amount the Ni and Mn is about 0.52:1. The solid mixture is calcined at the temperature of about 850° C. for about 12 hours, in the muffle furnace in air.

Example 2

In this example, the plurality of $LiNi_{0.5}Mn_{1.5}O_4$ particles 12 prepared with the diameter of about 5 micrometers in the example 1 are added to the $Al(NO_3)_3$ water solution to form the pasty mixture. The volume ratio of the $Al(NO_3)_3$ water solution and the plurality of $LiNi_{0.5}Mn_{1.5}O_4$ particles 12 is about 1:20. The $NH_4F$ water solution is added to the pasty mixture to react with the $Al(NO_3)_3$ and formed the $AlF_3$ layer 14 coated on the surface of each of the plurality of $LiNi_{0.5}Mn_{1.5}O_4$ particles 12. The molar ratio of the $F^-$ and $Al^{3+}$ is about 3:1. The $AlF_3$ layer 14 coated on the plurality of $LiNi_{0.5}Mn_{1.5}O_4$ particles 12 are filtered out and heat treated at about 400° C. for about 5 hours under a $N_2$ atmosphere. Thus, cathode active material 10 is formed and labeled as sample 2, wherein the molar ratio of the $AlF_3$ to the cathode active material 10 is about 1 mol %.

Example 3

The cathode active material 10 is prepared in the same way as in Example 2, except that the molar ratio of the $AlF_3$ to the cathode active material 10 is about 2 mol % and labeled as sample 3.

Example 4

The cathode active material 10 is prepared in the same way as in Example 2, except that the molar ratio of the $AlF_3$ to the cathode active material 10 is about 4 mol % and labeled as sample 3.

Figure 3:
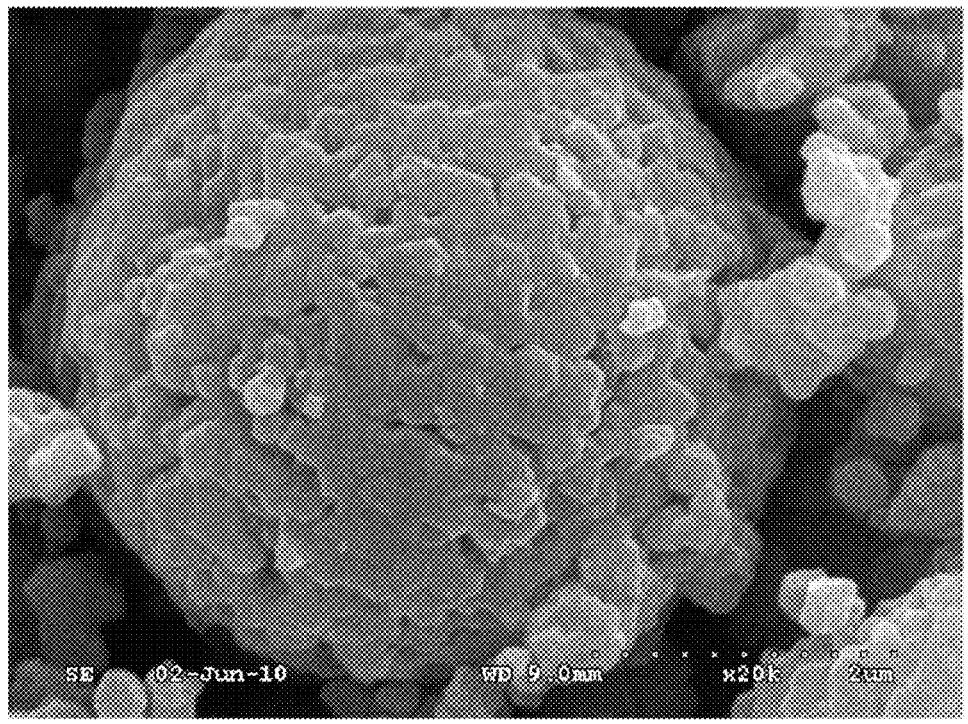
FIG. 3 is a photo showing a scanning electron microscope (SEM) image of a cathode active material of sample 1.
Figure 4:
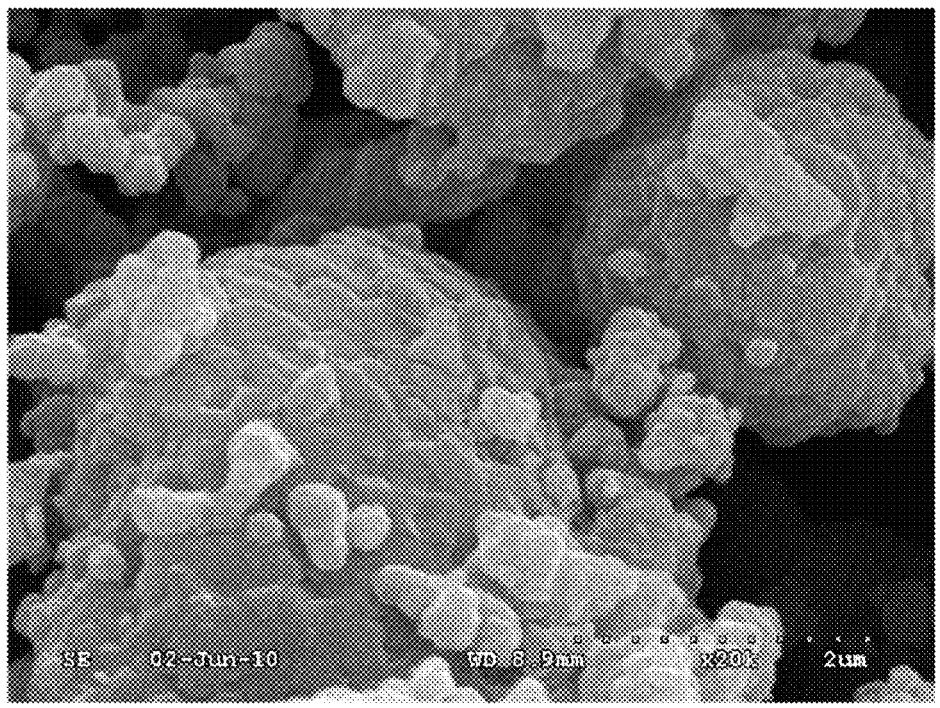
FIG. 4 is a photo showing a SEM image of one embodiment of a cathode active material of sample 4.

Referring to FIG. 3, a plurality of $LiNi_{0.5}Mn_{1.5}O_4$ primary particles aggregate and form a spherical $LiNi_{0.5}Mn_{1.5}O_4$ second particle (sample 1) with a diameter of about 5 micrometers. In addition, gaps can be clearly seen between the primary particles. Referring to FIG. 4, there are no gaps between the primary particles in the sample 4 which indicates that $AlF_3$ layer is uniformly coated on the surface of each spherical $LiNi_{0.5}Mn_{1.5}O_4$ second particle.

Figure 5:
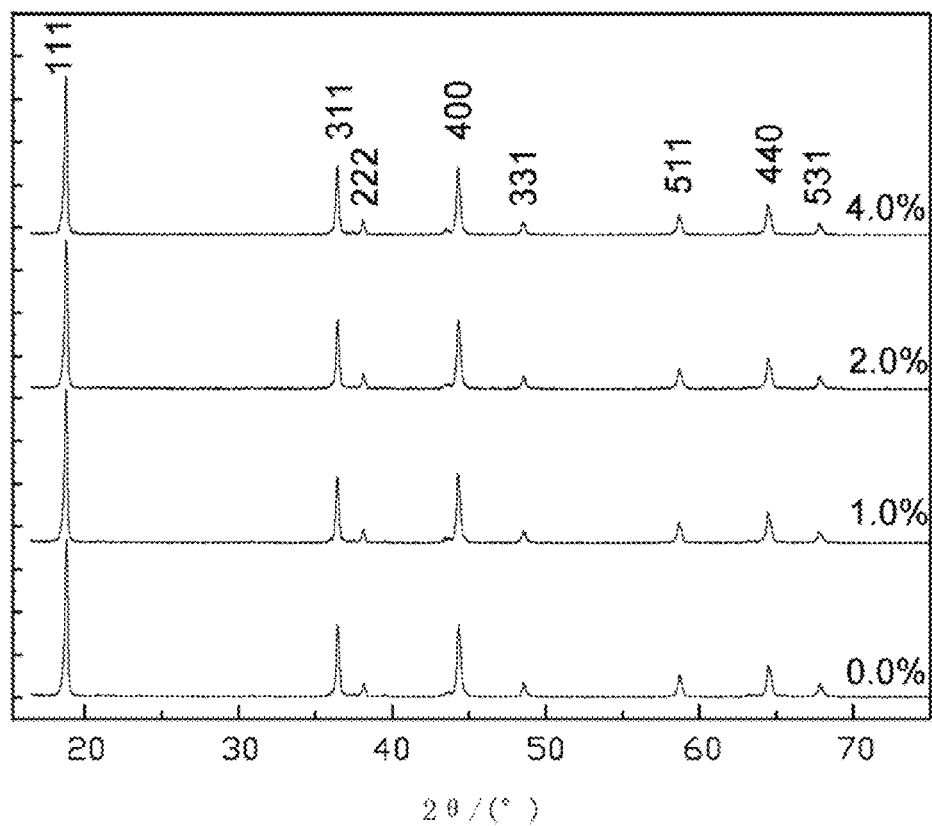
FIG. 5 is a graph comparing X-ray diffraction (XRD) patterns of cathode active materials of samples 1-4.

Referring to FIG. 5, samples 1-4 are measured by a XRD. All diffraction peaks of the samples 1-4 correspond to cubic spinel structures with the Fd3m space group. The lattice constants of the samples 1-4 are calculated to be 0.8168 nm, 0.8170 nm, 0.8169 nm and 0.8173 nm respectively. The lattice parameters show little changes before and after coating, indicating that the $AlF_3$ was not incorporated into the host structure and only coated on the surface of the plurality of $LiNi_{0.5}Mn_{1.5}O_4$ particles 12. That may be attributed to small content or amorphous shape of the $AlF_3$ due to heat treatment at a low temperature of about 400° C.

Four kinds of lithium ion batteries respectively using the samples 1-4 are assembled and compared for electrochemical characterization. The lithium ion batteries are assembled by the following method. First, about 80 parts by mass of the cathode active material, about 10 parts by mass of acetylene black as a conductive assistant, and about 10 parts by mass of PVDF as a binder, which is previously dissolved in NMP, are mixed together to form a slurry. Next, the slurry is uniformly coated on a surface of an aluminum foil, and dried in a vacuum oven at about 130° C. for about 20 hours to make a cathode. Metal lithium plate is used as an annode. A Celguard 2400 microporous film is used as a separator disposed between the cathode and the annode. A non-aqueous solution is used as an electrolyte, in which $LiPF_6$ is dissolved in a concentration of about 1.15 mol/L in a mixed solvent containing EC, DMC, and EMC in a volume ratio of about 3:3:1. CR2032 coin-type lithium ion batteries using the samples 1-4 respectively are then assembled in a glove box.

Figure 6:
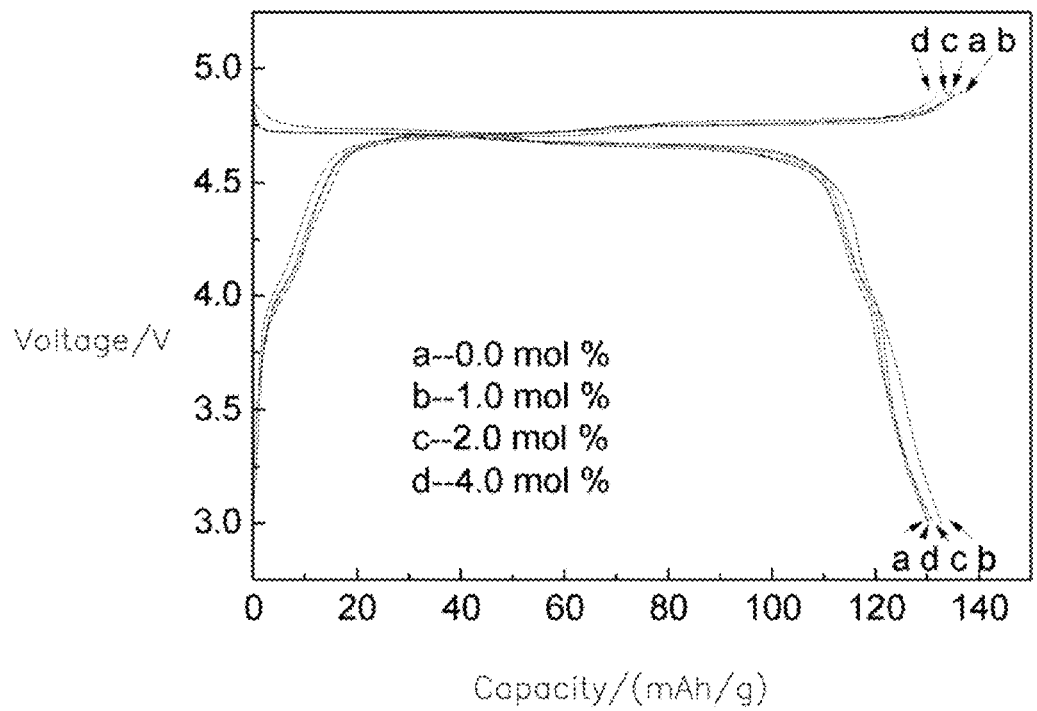
FIG. 6 is a graph comparing charge-discharge curves of lithium ion batteries fabricated using the samples 1-4.

Referring to FIG. 6, charge-discharge tests for four kinds of lithium ion batteries are galvanostatically performed from about 3.0 V to about 4.9 V at different current densities. Referring to FIG. 6, the four kinds of lithium ion batteries are performed from about 3.0 V to about 4.9 V at 0.2 C. The lithium ion battery using the sample 1 presents a discharge capacity of about 130.0 mAh/g. The lithium ion battery using the sample 2 presents the discharge capacity of about 132.6 mAh/g. The lithium ion battery using the sample 3 presents the discharge capacity of about 131.1 mAh/g. The lithium ion battery using the sample 4 presents the discharge capacity of about 130.4 mAh/g. The results in FIG. 6 indicate that the discharge capacity can be increased with a increasing of the $AlF_3$.

Figure 7:
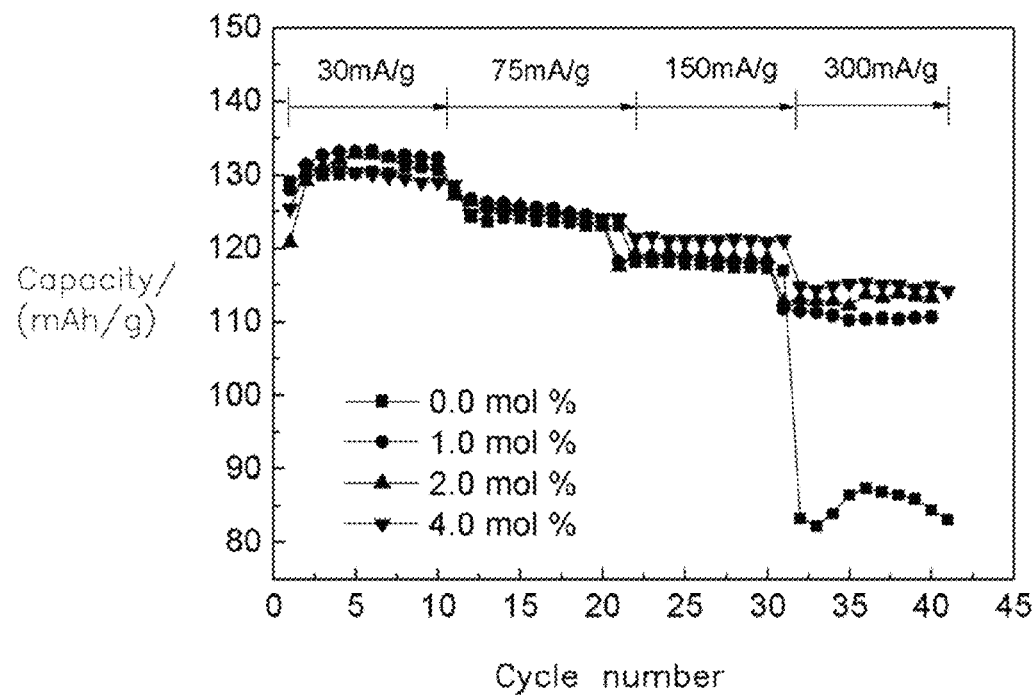
FIG. 7 is a graph comparing cycle performance curves of the lithium ion batteries fabricated using the samples 1-4.

Referring to FIG. 7, four kinds of lithium ion batteries are performed at various current densities. When discharged at current of about 150 mA/g (1 C), the capacity of four kinds of lithium ion batteries enhanced remarkably with increasing the $AlF_3$ amount. At about 300 mA/g current (2 C), the highest discharge capacity for the sample 1 only reaches about 87.3 mAh/g. On the other hand, the highest discharge capacity was shown to be about 110.8 mAh/g for the sample 2, 113.5 mAh/g for the sample 3, and 115.5 mAh/g for the sample 4, respectively Based on these results, the $AlF_3$-coating on the surface of $LiNi_{0.5}Mn_{1.5}O_4$ spinel was substantially more effective in enhancing capacity, retention, and rate capability.

Figure 8:
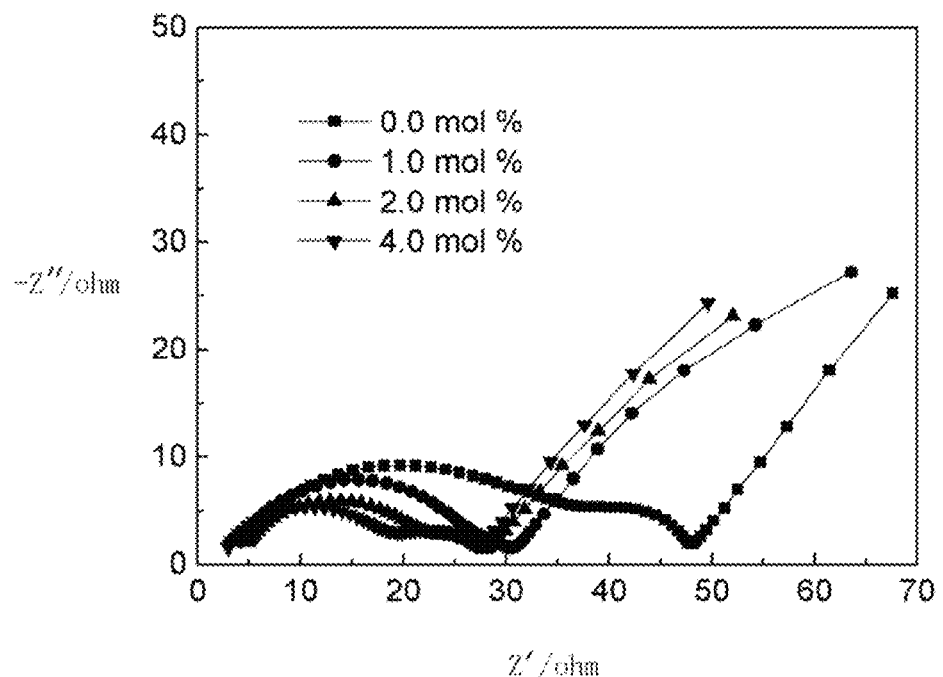
FIG. 8 is a graph comparing electrochemical impedance spectroscopy of cathodes made by the samples 1-4 under 4.9V of charge voltage.

Because the four kinds of lithium ion batteries are charged to high cut-off voltage of about 4.9V, electrolyte decomposition becomes main factor affecting their electrochemical performance. Electrolyte decomposition can lead to a formation of LiF-contained film on the electrodes, thus increase interface resistance and deteriorate its electrochemical performance. In order to verify the effect of $AlF_3$-coating on the reducing of electrolyte decomposition, electrochemical impedance spectroscopy tests are performed on the pristine and $AlF_3$-coated $LiNi_{0.5}Mn_{1.5}O_4$. These measurements are performed on electrodes after charge-discharged for 40 cycles and are shown in FIG. 8. The results show that $AlF_3$-coated electrodes can suppress the electrolyte decomposition remarkably.

The $AlF_3$ layer 14 of the cathode active material 10 can prevent the electron migration between the plurality of $LiNi_{0.5}Mn_{1.5}O_4$ particles 12 and the electrolyte of the lithium ion battery, as well as allow the lithium ions to pass therethrough. Therefore, a decomposition of the electrolyte or solvent can be avoided while lithium ions intercalate into and deintercalate out from the cathode active material 10 freely at a high charge voltage. Thus, the cathode active material 10 has an improved electrochemical performance.

Depending on the embodiment, certain steps of methods described may be removed, others may be added, and the sequence of steps may be altered. It is also to be understood that the description and the claims drawn to a method may include some indication in reference to certain steps. However, the indication used is only to be viewed for identification purposes and not as a suggestion as to an order for the steps.

Finally, it is to be understood that the above-described embodiments are intended to illustrate rather than limit the present disclosure. Variations may be made to the embodiments without departing from the spirit of the present disclosure as claimed. Elements associated with any of the above embodiments are envisioned to be associated with any other embodiments. The above-described embodiments illustrate the scope of the present disclosure but do not restrict the scope of the present disclosure.

What is claimed is:

1. A method for making a cathode active material of a lithium ion battery, comprising the following steps:
   fabricating a plurality of $LiNi_{0.5}Mn_{1.5}O_4$ particles;
   forming a solid-liquid mixture by adding the plurality of $LiNi_{0.5}Mn_{1.5}O_4$ particles to a trivalent aluminum source solution, and controlling a volume ratio of the trivalent aluminum source solution to the plurality of $LiNi_{0.5}Mn_{1.5}O_4$ particles in a range from about 1:10 to about 1:40 in the solid-liquid mixture;
   causing a fluorine source solution to react with the solid-liquid mixture;
   forming a $AlF_3$ coating on a surface of the plurality of $LiNi_{0.5}Mn_{1.5}O_4$ particles; and
   heat treating the plurality of $LiNi_{0.5}Mn_{1.5}O_4$ particles with the $AlF_3$ coating.

2. The method of claim 1, further comprises making the trivalent aluminum source solution by dissolving a trivalent aluminum source in a first amount of solvent, wherein the trivalent aluminum source is selected from the group consisting of aluminum nitrate, aluminum isopropoxide, and any combination thereof.

3. The method of claim 1, further comprise making the fluorine source solution by dissolving a fluorine source in a second amount of solvent, wherein the fluorine source is ammonium fluoride.

4. The method of claim 1, wherein the step of heat treating is carried out at a temperature in a range from about 300° C. to about 500° C.

5. A method for making a cathode active material of a lithium ion battery, comprising following steps:
   providing a plurality of $LiNi_{0.5}Mn_{1.5}O_4$ particles;
   forming a mixture by adding the plurality of $LiNi_{0.5}Mn_{1.5}O_4$ particles to a trivalent aluminum source solution, and $1:40 \leq V_{Al\text{-}source} : V_{LiNi0.5Mn1.5O4} \leq 1:10$, wherein $V_{Al\text{-}source}$ represents a volume of the trivalent aluminum source solution, and $V_{LiNi0.5Mn1.5O4}$ represents a volume of the plurality of $LiNi_{0.5}Mn_{1.5}O_4$ particles;
   causing a fluorine source solution to react with the mixture to form a $AlF_3$ coating on a surface of the plurality of $LiNi_{0.5}Mn_{1.5}O_4$ particles; and
   heat treating the plurality of $LiNi_{0.5}Mn_{1.5}O_4$ particles with the $AlF_3$ coating.

* * * * *